J. Alexander,

Churn.

No. 86,343.  Patented Feb. 2, 1869.

WITNESSES
Wm. A. Morgan
G. C. Cotton

INVENTOR:
J. Alexander
by
Munn & Co.
Attorneys

JOSEPH ALEXANDER, OF GALLIPOLIS, OHIO.

Letters Patent No. 86,343, dated February 2, 1869.

IMPROVEMENT IN CHURNS.

The Schedule referred to in these Letters Patent and making part of the same.

*To all whom it may concern:*

Be it known that I, JOSEPH ALEXANDER, of Gallipolis, in the county of Gallia, and State of Ohio, have invented a new and improved Churn; and I do hereby declare that the following is a full, clear, and exact description thereof, which will enable those skilled in the art to make and use the same, reference being had to the accompanying drawings, forming part of this specification.

This invention relates to a new and improved churn, constructed and arranged in such a manner that butter may be produced from the cream in a comparatively short time, and air incorporated with the cream during the process of churning.

In the accompanying sheet of drawings—

Figure 1:
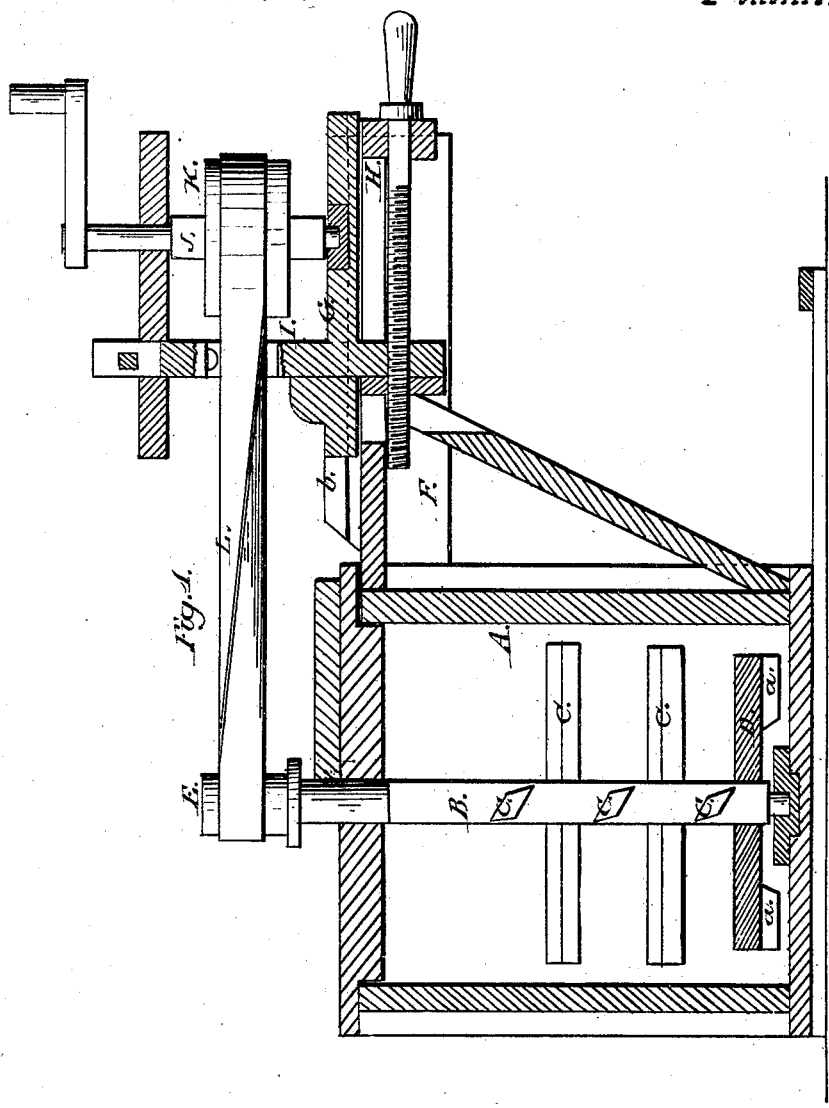

Figure 1 is a side sectional view of my invention.

Figure 2:
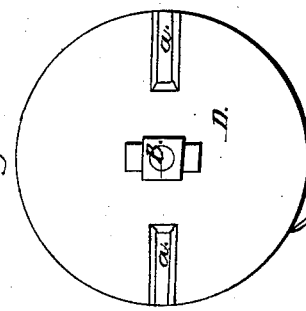

Figure 2, a detached inverted plan of the dasher.

Similar letters of reference indicate corresponding parts.

A represents the cream-box of the churn, which may be of any suitable shape. A cylindrical or slightly-conical form would probably be as desirable as any.

B is a shaft, which is fitted centrally in the cream-box A, and has arms, C, passing horizontally through it, of diamond or lozenge-shape in their transverse section, said arms being placed one above the other, and each arm having a position at right angles to the one above or below it.

On the lower part of the shaft B, there is secured a circular disk, D, having radial cleats, a, attached to its under side, two or more. (See figs. 1 and 2.)

On the upper end of the shaft B, above the lid of the churn, there is keyed a pulley, E.

F is a framing, attached to the churn, having guides, b, secured upon it, between which a slide, G, is fitted, said slide being adjusted or moved by a screw, H, as will be fully understood by referring to fig. 1.

The slide G has a frame, I, secured to it, which supports a vertical shaft, J, to which the power is applied.

This shaft J has a pulley, K, keyed upon it, around which, and the pulley E, a belt, L, passes, and by adjusting the frame I, through the medium of the screw H, the belt L may be kept at a proper degree of tension.

As the shaft B is rotated, the arms C will, owing to the centrifugal force generated by their rotation, throw the cream outward from the shaft B toward the side of the churn, and said arms, owing to their shape, will, at the same time, throw the cream upward, leaving a vacant space around the shaft B, while the cleats a throw the cream outward from the bottom of the shaft, and admit of a circulation of air passing down to the bottom of the cream-box, so that the air and cream will, during the movement of the latter, be brought in thorough contact, and the production of butter greatly facilitated.

I claim as new, and desire to secure by Letters Patent—

The churn-dasher, consisting of the horizontal arms C, passing, at right angles to each other, through the shaft B, and the disk D, affixed to the bottom of said shaft, and provided with the two radial cleats a, all constructed as herein shown and described.

JOSEPH ALEXANDER.

Witnesses:
GEO. W. ALEXANDER,
JOHN SILVEY.